United States Patent [19]

Mortlock et al.

[11] Patent Number: 4,477,845
[45] Date of Patent: Oct. 16, 1984

[54] DYNAMIC SKEW CORRECTION FOR MULTICHANNEL ANALOG RECORDING

[75] Inventors: Clarence E. Mortlock, Media; Joseph A. Brady, Norristown; Marvin Shapiro, Warminster, all of Pa.

[73] Assignee: The United States of America as represented by the Secretary of the Navy, Washington, D.C.

[21] Appl. No.: 350,899

[22] Filed: Feb. 22, 1982

[51] Int. Cl.³ .......................... G11B 5/43; G11B 5/02
[52] U.S. Cl. ........................................ 360/26; 360/29
[58] Field of Search .............................. 360/26, 28, 29

[56] References Cited

U.S. PATENT DOCUMENTS

| | | | |
|---|---|---|---|
| 2,975,240 | 3/1961 | Berry | 360/28 |
| 3,204,228 | 8/1965 | Eckert, Jr. et al. | 360/26 |
| 3,938,184 | 2/1976 | DeFrancesco et al. | 360/28 |

Primary Examiner—Vincent P. Canney
Attorney, Agent, or Firm—Robert F. Beers; Frederick A. Wein

[57] ABSTRACT

Dynamic skew correction of multichannel analog information is presented. A carrier frequency signal is amplitude modulated by a lower frequency modulation signal derived from a common source and having predetermined zero crossing and phase characteristics. The amplitude modulated carrier signal is recorded on at least two of a plurality of channels simultaneously with recording on the respective channels of the analog information. Upon playback, the various modulated signals are derived from the plurality of channels simultaneously with the playback analog information recorded on the respective channels. The predetermined characteristics of the derived carrier and lower frequency modulation signals are used for processing the played back information for time displacing the information derived from the individual channels for correcting skew errors between the various channels.

6 Claims, 6 Drawing Figures

DYNAMIC SKEW CORRECTION FOR MULTICHANNEL ANALOG RECORDING

BACKGROUND OF THE INVENTION

The present invention relates to magnetic tape transport apparatus, and more particularly, to dynamic skew correction for multichannel analog recording for securing accurate phase and time relationships between signals recorded on a plurality of parallel tracks of a single recording and reproducing medium such as magnetic tape.

The recordation of information using systems having a plurality of parallel recording channels requires synchronization, alignment of phase and time relationships between the plurality of signals simultaneously recorded on the plurality of respective recording channels. This alignment is necessary to insure accurate recovery of the recorded data which would otherwise be prevented from being accurately recorded by typically occuring tape skew, jitter, wow, or flutter.

Retrieval or recovery of the data recorded on each of the channels must be accomplished substantially concurrently. Ideally, simultaneous information should be disposed on the recording tape in a line perpendicular to the longitudinal length of the tape and upon playback or reading of the tape, such information should be read back simultaneously. However, this requirement is frustrated by any physically misalignment, skew, or jitter of the tape in respect to the read-write heads of the recording systems. For example, in an extreme case, tape skew can result in information from two or more concurrently recorded groups being read serially instead of paralled as recorded. Accurate recovery of parallel recorded information requires some means of correcting or compensating for an misalignment such as for tape skew.

The phenomena known as skew may be defined as the difference in time measured between several read-back portions of differing channels. Skew is a product of two factors which result when the tape information is not recorded perpendicular to the edge of the recording tape. The first of these factors is static skew, determined by the physical alignment of the recording heads and the tape guides and also by the alignment of the original track recording heads within the head assembly. The other factor is dynamic skew, the result of the wandering and squirming of the tape as it passes across the recording head. Other factors such as the asymmetry and pattern sensitivity of the recording head also contribute to the overall skew conditions.

Permanent misalignment of heads between different recording and reproducing apparatus may be compensated for by fixed adjustments and therefore are not too serious. However, transient misalignment, due to flutter and dynamic skew of the tape, the first being due to vibration of the tape as it passes across the tape are more serious. Additionally, tape skew may be due to the sides of the tape not being cut absolutely parallel or to permanemt misalignment of the tape feed mechanism. Both effects result in the heads reproducing the individual tracks engaging the heads in echelon instead of strictly in line normal to the alignment of the tape with a consequent relative time shift displacement between the reproduced signals. All these factors are generally lumped together and referred to as "skew" because in practice they are inseparable from a measurement point of view. The total skew is the sum of the skew created when writing information on tape and the skew created when reading the same information from tape.

Tape skew accounts for a substantially large percentage of reading errors due to equipment incompatibility, such as when tapes are read by equipment different from that on which they were recorded, thus giving rise to serious compatibility problems. The real world is an analog world and much of the information and data compiled for recording is in analog form. It is common practice in recording analog information on multichannel records to correct for skewing errors and the like by digitizing the information formation and encoding the data for each channel prior to recording in order to permit subsequent digital compensation for skewing errors and the like upon playback. Such digitizing and encoding prior to recording and digital-to-analog conversion after playback requires digital apparatus needed for skew correction and entails substantial equipment expense. Accordingly, it is desirable to provide for dynamic skew correction of multichannel analog recording which avoids a necessity for digitizing and encoding the data for analog information for each channel prior to recording.

SUMMARY OF THE INVENTION

Briefly, the present invention provides for dynamic skew correction of multichannel analog information. A carrier frequency signal is amplitude modulated by a lower frequency modulation signal derived from a common source and having predetermined zero crossing and phase characteristics. The amplitude modulated carrier signal is recorded on at least two of a plurality of channels simultaneously with recording on the respective channels of the analog information. Upon playback, the various modulated signals are derived from the plurality of channels simultaneously with the playback analog information recorded on the respective channels. The predetermined characteristics of the derived carrier and lower frequency modulation signals are used for processing the played back information for time displacing the information derived from the individual channels for correcting skew errors between the various channels.

OBJECTS OF THE INVENTION

Accordingly, it is an object of the present invention to provide dynamic tape skew correction of multichannel analog recordings. Another object of the present invention is to provide dynamic tape skew correction of multichannel recordings without having to digitize the analog information prior to recording in order to correct for tape skew. A further object of the present invention is to provide dynamic skew correction of multichannel analog recordings by recording an amplitude modulated carrier signal modulated by a lower frequency modulation signal having predetermined characteristics simultaneously with the analog information.

Further objects and advantages of the present invention will become apparant as the following description proceeds and features of novelty characterizing the invention will be pointed out with particularity in the claims annexed to and forming a part of this specification.

DESCRIPTION OF THE DRAWING

For a better understanding of the present invention reference may be had to the accompanying drawings wherein the same reference numerals have been applied to like parts and wherein.

DETAILED DESCRIPTION OF THE PREFERRED EMBODIMENT

Figure 1:
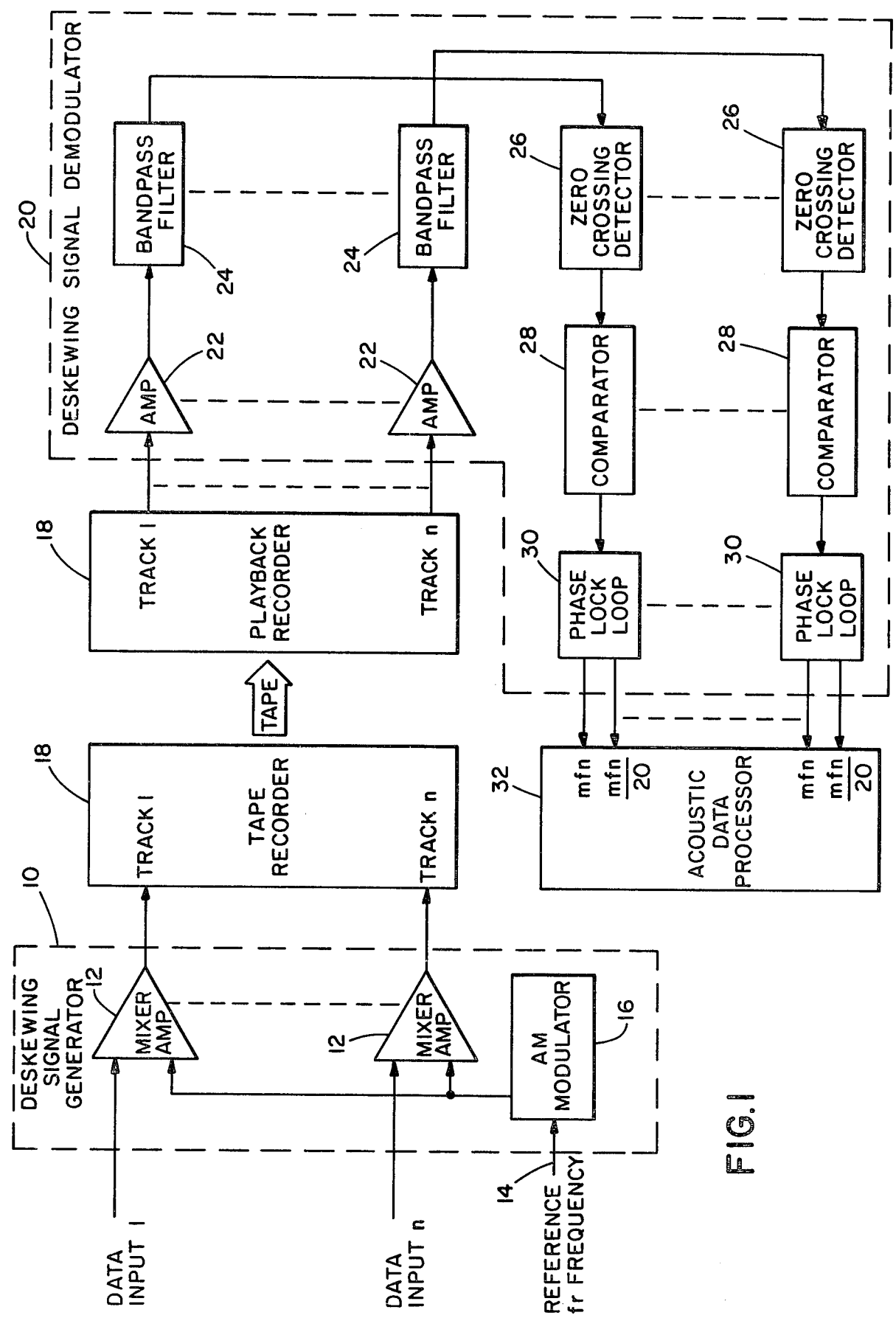
FIG. 1 shows a representative block diagram of the dynamic tape skew correction apparatus of the present invention.

The problem presented is to resolve channel-to-channel time displacement error in the data of a multichannel analog recording system caused by inherent tape recorder and playback static and dynamic skew. A unique signal is recorded on various channels simultaneously with analog data and is recoverable at tape playback. The recovered signal allows a digital processor to correct for the time displacement errors between channels and permits precise time alignment of the analog data which has been recorded on a plurality of channels. The system is independant of recorder tape speed or the number of channels.

The time displacement errors are inherent in multichannel recorded analog data and results largely from the random and oblique motion (dynamic skew) of the recording tape as it passes over the heads of the record and playback tape recorders. In the exemplary embodiment, the deskewing signal is recorded on each track of the recorder simultaneously with the respective analog data. The deskewing signal comprises an out-of-band complex waveform which characteristics are precisely known. In the exemplary embodiment, the waveform is an amplitude modulated (AM) signal of which the carrier and modulating signal are derived from a common source and hence are frequency and phase related. During playback of the tape the amplitude modulated signal on each track is recovered in a deskewing demodulator. Within the demodulator, the modulating low frequency signal's zero-crossings are detected and used to generate equal length blocks of pulses at the carrier rate that are forwarded to a digital processor along with the low frequency zero-crossing information. It should be noted that in the exemplary embodiment the deskewing signal is recorded on each track of the recorder, however, in a simplification, the recording signal need only be recorded on two tracks, preferrably the most separated tracks such as the outermost tracks, with the time displacement of the other tracks being extrapolated according to their respective position with respect to the deskewing signal recording tracks. Other tracks other than the outermost tracks can be used in which case extrapolation time displacement profile across the width of the tape can be calculated for providing time displacement correction information for the each of respective channels according to their positions across the width of the tape.

The inputs used by the digital processor are used to calculate sampling rates for analog/digital conversion of the analog data associated with the respective track and identifying blocks of pulses between respective tracks. The blocks of sampling pulses received by the processor for each track are displaced in time from one another by the amount of static and dynamic skew introduced by the record and playback heads. Within the processor the time difference is detected and used to advance or retard corresponding blocks of digitized analog data to bring them into time alignment with one another. The accuracy which the individual tracks of data can be aligned in time is dependant upon the frequency of the carrier of the amplitude modulated deskewing signal.

Figure 2:
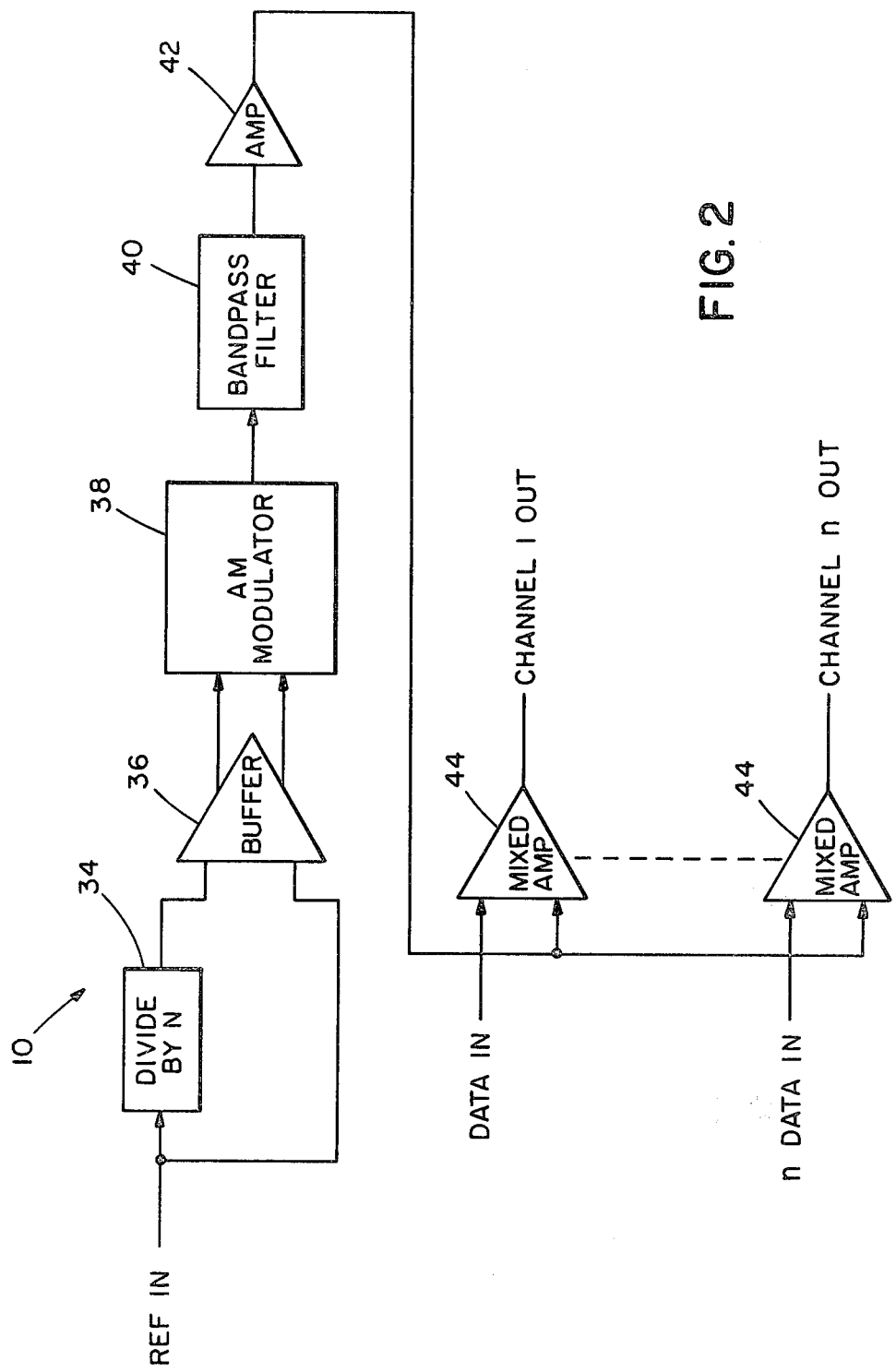
FIG. 2 is a block diagram showing in greater detail the deskewing signal generator in FIG. 1.

More particularly, referring now to the figures wherein like members have been designated with like numerals, FIG. 1 shows the dynamic skew correction system with associated equipment interface. A deskewing signal generator 10 comprises a mixer amplifier 12 for each of the tracks of the multichannel recorder. A reference carrier frequency is inserted at 14 into the AM modulator 16 for amplitude modulating the reference carrier frequency with a lower frequency signal. The modulation frequency and reference frequency are both derived from a common source as shown in FIG. 2 and as such have known frequency and phase relationships. This modulated AM signal is mixed with the respective data inputs in respective mixer amplifiers 12 and fed to the respective tracks of tape recorder 18. Thus, the data input on the respective tracks is recorded simultaneously with the AM modulated carrier frequency which is at a higher frequency band than the data input signal. The respective played back signals of the tracks are then fed in a deskewing signal demodulator 20 comprising, for each track, an amplifier 22, an band pass filter 24, a zero-crossing detector 26, and a comparator 28, feeding a phase lock loop (PLL) 30 for feeding an accoustic data processor 32. The processing on the track-to-track time displacement errors using the present invention can be accomplished serially (a single track at a time using a single demodulator) or in parallel, (all tracks simultaneously) using a plurality of demodulators. The rate of playback and processing is not critical to the operation of the deskewing system but only dependant upon the capability and limitations of the supporting equipment in the data processing terminal.

Referring now to FIG. 2, the deskewing signal is derived from an external stable reference frequency $f_r$ produced by a crystal oscillator or the like. The frequency of the source is limited by the highest frequency of the data signal to be recorded and the upper frequency limit of the recording circuitry of the tape recorder. This upper upper frequency limit also determines the maximum resolution to which the time displacement error can be corrected. The reference is inputted into two networks: a divide by N network 38 and a buffer amplifer 36. The divide by N network 38 is selected to be compatible with the maximum time displacement to be encountered between any two tracks within the recorder and in the exemplary embodiment are commerically available CD 4017 and CD 4013 networks. In addition to being used in the demodulator to regenerate the carrier, the lower frequency modulation signal is also used to identify the start of a block of sampling pulses for the data processor as will be explained hereinafter. The output of the divide by N network 38 and the reference frequency are buffered at 36 and fed into an amplitude modulator circuit 38 in the exemplary embodiment being a commercially available LM 1496. The output of modulator 36 is therefore the reference input signal amplitude modulated by a low frequency signal which frequency is related to the carrier or referenced by the factor N. In addition, the modulating signal has zero-crossings precisely in phase with the carrier by virtue of the fact that they are both derived from the same source. The output of modulator 36 is fed to bandpass filter 40 and in turn to an amplifier 42 typically LM 324.

The deskewing signal is then inputted to a bank of linear mixer amplifiers 44 for combining the deskewing signal with the individual input data signals. Thus, the complex output of each of these amplifiers (one for each record channel) comprises of the input data signal combined with the commonly derived deskewing signal. Each amplifier output is applied to their respective individual record channels of the multitrack tape recorder. In the exemplary embodiment, $f_r=3125$ Hz which is derived from an external source and N was selected to be 20.

Figure 3:
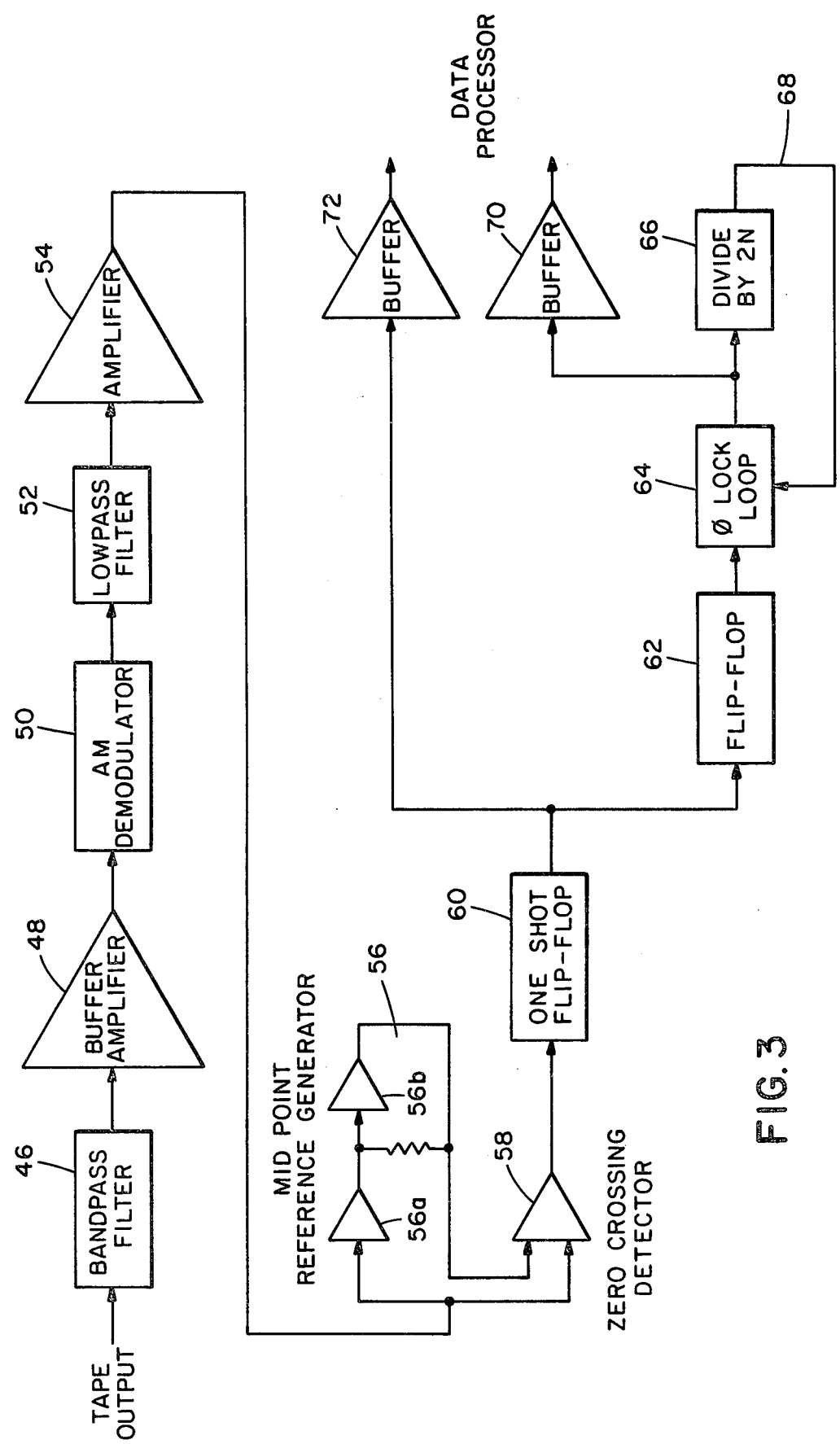
FIG. 3 is a block diagram showing in greater detail the deskewing signal demodulator of FIG. 1.

Referring now to FIG. 3 the tape output is fed to a bandpass filter 46 so that only the deskewing frequencies spectrum is present. The frequencies of interest are the carrier and its upper and lower side bands. The deskewing signal is inputted to a bandpass filter 46 which is designed to select the frequencies of interest and limit the broad band common mode noise. The deskewing signal is then fed to a buffer amplifier 48 and than to an AM demodulator 50 which is a conventional amplitude modulation detector which output is the low frequency modulation signal ($f_m$). The signal $f_m$ is than filtered by a 20 db/decade low pass filter network 52 to improve the signal to noise ratio. The filtered signal is then fed to an amplifier 54 and inputted to the mid-point reference generator 56 comprising amplifiers 56a, b, to generate the mid-point reference level for signal $f_m$.

Figure 4:
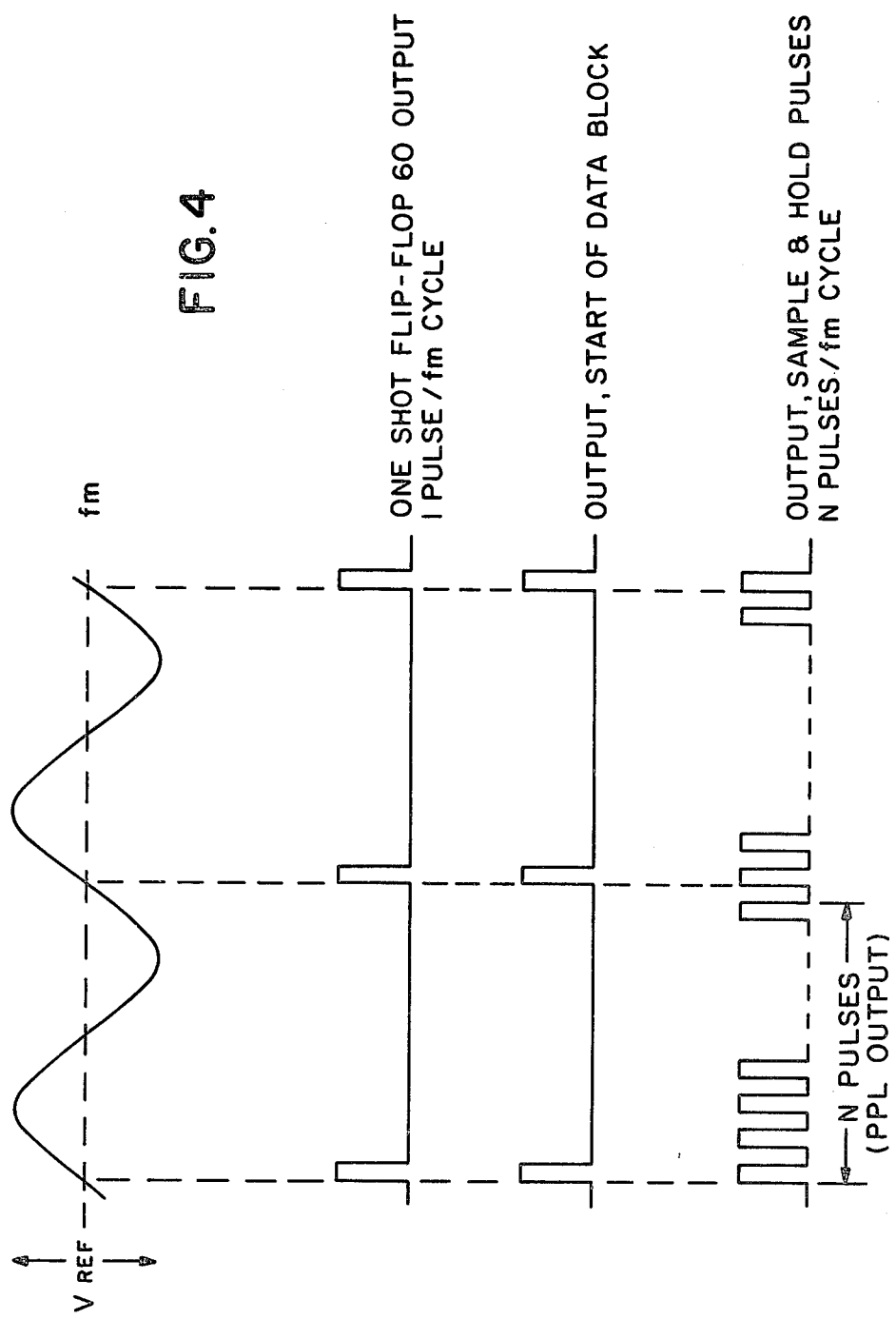
FIG. 4 shows a timing diagram of pulses generated by the deskewing signal demodulator of FIG. 3.

The mid-point reference signal together with the $f_m$ envelope are inputted to the zero-crossing detector 58 which will be discussed in greater detail hereinafter. The mid-point reference input to the detector assures that the zero crossing detector is always functioning about the mid-point of the $f_m$ signal envelope. When signal $f_m$ crosses the mid-point, the zero-crossing detector 58 generates a positive going pulse which triggers a one-shot flip-flop 60 to produce uniform pulses at the rate $f_m$ as shown in FIG. 4. These pulses from one-shot flip-flop 60 actuate a flip-flop 62 to generate a train of pulses at a 50% duty cycle to operate a phase lock loop 64. The phase lock loop is used to regenerate the deskewing carrier by functioning as a frequency synthesizer due to a external divide by 2N counter 66 in its feedback loop 68. Thus, the phase comparater input to the PLL runs at $f_m$ divided by 2 and the voltage controlled oscillator runs at ($f_m$ divided by 2)$\times 2N$ or $Nf_m$. This output is fed to buffer 70 to drive sample and hold circuitry in data processor 32. The $f_m$ pulse rate is fed to buffer 72 which also outputs pulses for the data processor 32. The output of buffer 72 is used in processor 32 to identify the beginning of each block of N sample and holds pulses. The timing diagram of the pulses of the modulator is shown in FIG. 4. In the exemplary embodiment the demodulator was built for two and four times the record speed of the tape playback.

Figure 5:
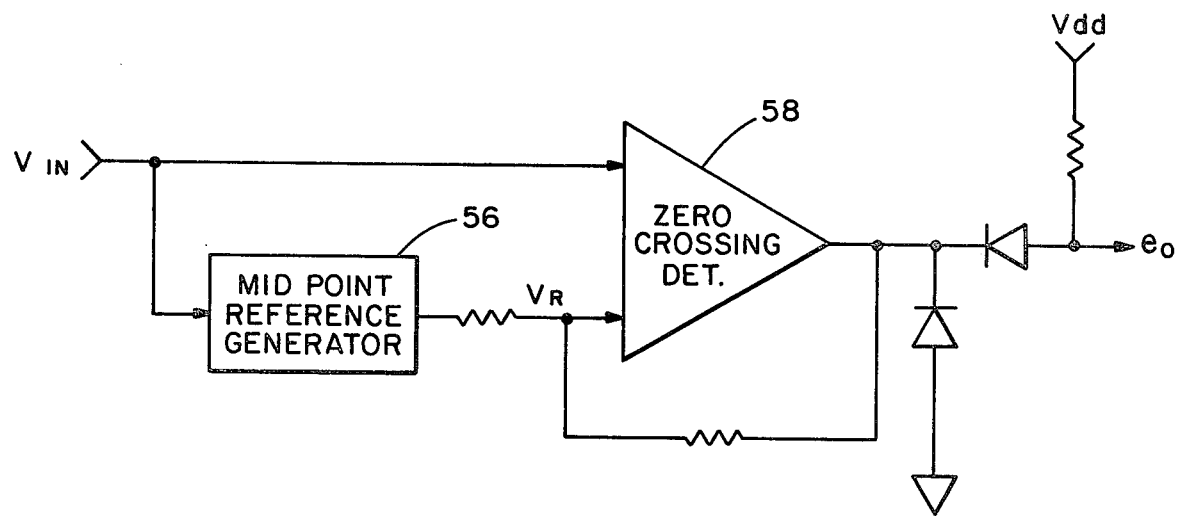
FIG. 5 is a block diagram in greater detail of the midpoint reference generator and zero-crossing detector of FIG. 3.

Referring now to FIG. 5 there is shown in greater detail the mid-point reference generator 56 and zero crossing detector 58. $V_{in}$ is applied simultaneously to the mid-point of reference generator 56 and zero-crossing detector 58. By comparing the value of $V_{in}$ by a version of itself ($V_R$) any DC component that may appear in $V_{in}$ due to distortion, noise in the signal, and the like, will be cancelled out which would not be the case if the $V_r$ input to the zero crossing detector were simply tied to ground. Thus, the integrity of the zero-crossing of the input signal is assured.

Figure 6:
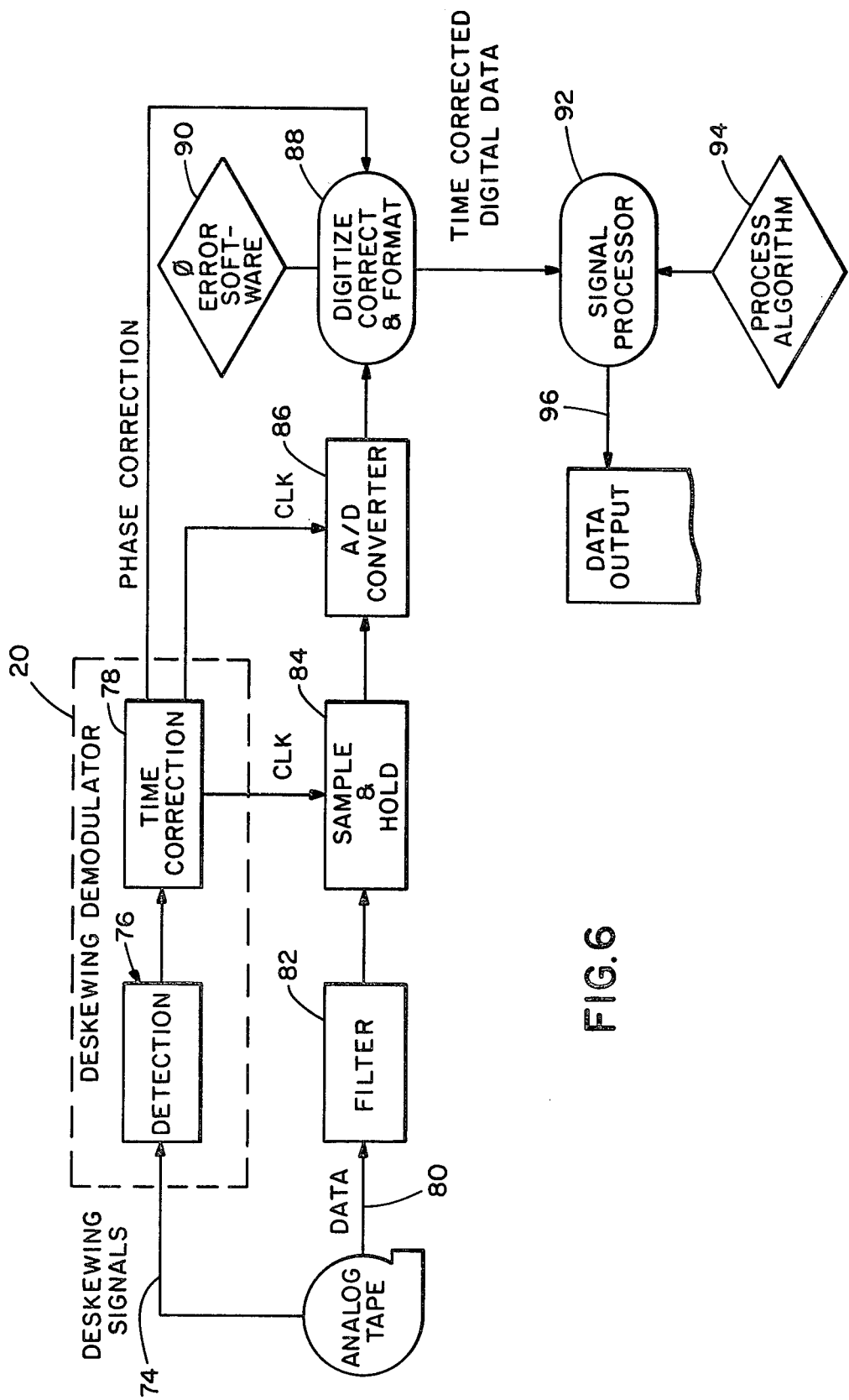
FIG. 6 is a block diagram in greater detail of the accoustic data processor of FIG. 1.

Referring now to FIG. 6, where is shown details of the data processor 32 and interface with previously disclosed apparatus. Deskewing signals 74 are fed to the deskewing demodulator 20 comprising previously disclosed circuitry, generally designated 76, and further comprising time correction circuitry 78. Data 80 from the analog tape is passed thru filter 82 and then fed to sample and hold circuitry 84 which is also fed by clock pulsed generated as described hereinbefore. The data is then inputted to analog to digital (A/D) converter 86 along with clock pulses from time correction circuitry 78 and inputted to digital formator 88 which is also fed phase correction signals from the time correction circuitry 78 and a phase error software 90. The time corrected digital data is inputted to signal processor 92 which is simultaneously inputted with a process algorithm 94 and the deskewed data is outputted at 96.

Thus, there is disclosed dynamic skew correction of multichannel analog recorded information. A carrier frequency signal is amplitude modulated by a lower frequency modulation signal having predetermined zero crossing and phase characteristic with respect to the carrier signal and derived from a common source as the carrier frequency signal. The amplitude modulated carrier signal is recorded on at least two of a plurality of channels simultaneously with recording on the respective channels of the analog information. Upon playback, the various modulated signals are derived from the plurality of channels simultaneously with the playback analog information recorded on the respective channels. The predetermined characteristics of the derived carrier and lower frequency modulation signals are used for processing the playback information for time displacing the information derived from the individual channels for correcting skew errors between the various channels.

While there has been illustrated and described what is at present considered to be a preferred embodiment of the present invention, it will be appreciated that numerous changes and modifications are likely to occur to those skilled in the art and it is intended in the appended claims to cover all those changes and modifications which fall within the true spirit and scope of the present invention.

What is claimed as new and desired to be secured by Letters Patent is:

1. A apparatus for dynamic skew correction of multichannel analog recorded and played back information comprising:
    means for generating a carrier frequency signal amplitude modulated by a lower frequency modulation signal having predetermined characterists comprising predetermined frequency and phase relationships with the carrier signals and the modulation signals being derived from a common source and are frequency and phase related, the predetermined frequency and phase relationships permitting predetermination of the time relationship of zero crossing points of the derived individual lower frequency modulation signals,
    means for recording the amplitude modulated carrier signal on at least two of a plurality of channels simultaneously with the recording on the respective channels of the analog information, means for deriving the recorded amplitude modulated carrier signals and the lower frequency modulation signals from the plurality of channels simultaneously with the respective played back analog information, means for comparing the predetermined characteristics of the derived signals for determing skew errors, and means for time displacing the played back information for correcting skew errors between the various channels.

2. A method of dynamic skew correction of multichannel analog recorded and played back information comprising the steps of:

generating a carrier frequency signal amplitude modulated by a lower frequency signal modulation signal having predetermined characteristics, the predetermined characteristics comprising predetermined frequency and phase relationships, with the carrier signals and the modulation signals being derived from a common source and being frequency and phase related, the predetermined frequency and phase relationships permitting predetermination of the time of zero crossing points of the derived individual lower frequency modulation signals, recording the amplitude modulated carrier signal on at least two of a plurality of channels simultaneously with the recording on the respective channels of analog information, deriving the recorded amplitude modulated carrier signals and the lower frequency modulation signals from the plurality of channels simultaneously with the respective played back analog information, comparing the predetermined characteristics of the signals for determining skew errors, and time displacing the played back information for correcting skew errors between the various channels.

3. The method of claim 2 wherein the carrier signals and the modulation signals are derived from a common source and are frequency and phase related and wherein the predetermined frequency and phase relationships permit predetermination of the time relationship of zero crossing points of the derived individual lower frequency modulation signals.

4. A deskewing signal demodulator for determining the skewing error in multichannel analog recorded and played back information wherein a carrier frequency signal amplitude modulated by a lower frequency signal having predetermined zero crossing time characteristics is recorded, played back and derived on at least two of the multichannels simultaneously with analog information recorded on the respective channel and comprising:

zero crossing detector means for determining the time relationship of the individual derived lower frequency modulation signals, means for determining the time adjustment of the processing of the respective channels based upon the predetermined time relationship between zero crossing for bringing the information on the individual channels into time alignment with each other.

5. The demodulator of claim 4 wherein the zero crossing detector means comprising a mid-point reference generator for operating on the modulation signal and a zero crossing detection means for determining the zero crossing of the voltage input and the output of the mid-point reference generator.

6. The demodulators of claims 4 or 5 further comprising means for time displacing the information of the individual channels into time alignment with each other.

* * * * *